United States Patent
Vogt et al.

(10) Patent No.: US 10,352,106 B1
(45) Date of Patent: Jul. 16, 2019

(54) CRADLE FOR RETENTION, TRANSPORTATION AND ROTATION OF BLOWOUT PREVENTER

(71) Applicant: Woolslayer Companies, Inc., Tulsa, OK (US)

(72) Inventors: Dewayne Vogt, Tulsa, OK (US); Shelby Heidemann, Tulsa, OK (US)

(73) Assignee: Woolslayer Companies, Inc., Tulsa, OK (US)

(*) Notice: Subject to any disclaimer, the term of this patent is extended or adjusted under 35 U.S.C. 154(b) by 0 days.

(21) Appl. No.: 15/890,890

(22) Filed: Feb. 7, 2018

Related U.S. Application Data

(60) Provisional application No. 62/455,974, filed on Feb. 7, 2017.

(51) Int. Cl.

| | | |
|---|---|---|
| *F16M 11/00* | (2006.01) | |
| *E21B 15/00* | (2006.01) | |
| *F16M 1/00* | (2006.01) | |
| *E21B 33/06* | (2006.01) | |
| *E21B 7/02* | (2006.01) | |
| *E21B 23/00* | (2006.01) | |
| *E21B 7/04* | (2006.01) | |

(52) U.S. Cl.
CPC ............ *E21B 15/003* (2013.01); *E21B 7/026* (2013.01); *E21B 33/06* (2013.01); *F16M 1/00* (2013.01); *E21B 7/046* (2013.01); *E21B 2023/008* (2013.01)

(58) Field of Classification Search
None
See application file for complete search history.

(56) References Cited

U.S. PATENT DOCUMENTS

| | | | |
|---|---|---|---|
| 2,527,225 A | 10/1950 | Langstaff | |
| 3,587,734 A | 6/1971 | Shaffer | |
| 5,251,869 A | 10/1993 | Mason | |
| 7,040,411 B2 | 5/2006 | Kainer | |
| 7,086,474 B1 | 8/2006 | Trevithick | |
| 7,389,820 B2 | 6/2008 | Day | |
| 2003/0079883 A1* | 5/2003 | McCulloch | B66C 19/00 166/379 |
| 2015/0068726 A1 | 3/2015 | Vogt | |
| 2015/0226026 A1 | 8/2015 | Kent | |
| 2015/0377409 A1 | 12/2015 | Vogt et al. | |

FOREIGN PATENT DOCUMENTS

| | | |
|---|---|---|
| CN | 201288527 U | 8/2009 |
| CN | 201963244 U | 9/2011 |
| CN | 204960871 | 1/2016 |

* cited by examiner

*Primary Examiner* — Amy J. Sterling
(74) *Attorney, Agent, or Firm* — Head, Johnson, Kachigian & Wilkinson, PC

(57) ABSTRACT

A retention, transportation and positioning cradle for a blowout preventer. The cradle includes a frame surrounding a circumference of the blowout preventer, with the frame having an opening for receipt or removal of the blowout preventer. A lift connecter mechanism on the frame connects to a lift mechanism. A pivoting gate encloses the opening on the frame. A plurality of rollers on an upper support surface of the frame engages the blowout preventer permitting rotation of the blowout preventer with respect to the cradle.

11 Claims, 8 Drawing Sheets

CRADLE FOR RETENTION, TRANSPORTATION AND ROTATION OF BLOWOUT PREVENTER

CROSS REFERENCE

This application claims priority to and the benefit of U.S. Provisional Patent Application Ser. No. 62/455,974, filed Feb. 7, 2017, which is incorporated herein in its entirety by reference.

BACKGROUND OF THE INVENTION

Field of the Invention

The present invention relates to a cradle or collar for retention of a blowout preventer during transportation and storage of the blowout preventer and during use of the blowout preventer and also provides for rotational positioning of the blowout preventer during installation and at a wellhead.

Description of the Related Art

Blowout preventers are large known devices ranging from about 10 to 80 tons incorporating a series of valves to prevent unwanted fluid release. They are transported to a desired drilling or production site and installed during assembly of a rig. Once the drilling or production has been completed, the rig is dismantled and the blowout preventer is transported to a new location. The blowout preventer is typically transported in the horizontal position on a flatbed trailer. The blowout preventer is moved to a vertical position and then moved laterally over a well center line for attachment to a wellhead at or near surface level. The blowout preventer may be suspended from a lift mechanism, such as a crane or block and tackle, while being installed.

A series of flange bolts are used to connect the blowout preventer to the wellhead. Accordingly, it is sometimes necessary to rotate the blowout preventer to permit alignment of the flange bolts to openings for receipt of the bolts.

Additionally, blowout preventers will often include a series of arms or rams which extend from the cylindrical main portion of the blowout preventer. In many cases, the wellhead is located beneath a drill floor but within supporting substructure. It may be necessary to rotate the blowout preventer in order to avoid the supporting substructure.

Accordingly, the blowout preventer may require rotation to prevent clashing with the substructure in order to move the blowout preventer into place over the wellhead and in order to later remove the blowout preventer.

It would also be desirable to provide a cradle or collar for a blowout preventer that permits rotational movement while the blowout preventer is being installed or being removed at the well site.

A further object and purpose of the present invention is to provide a cradle or collar for retention of a blowout preventer wherein the cradle can remain in place around the blowout preventer during operation with the well and also during transportation and storage of the blowout preventer.

A further object and purpose of the present invention is to provide a cradle or collar for retention of a blowout preventer to permit manual or mechanical rotation of the blowout preventer.

A further object and purpose of the present invention is to provide a cradle or collar for retention of a blowout preventer that will accommodate various sizes and dimensions of blowout preventers.

SUMMARY OF THE INVENTION

The present invention is directed to a retention, transportation and positioning cradle or collar which may be attached to and installed around a blowout preventer.

The cradle includes a pair of opposed projecting ears. Each of the ears includes an opening therethrough for connection to a shackle, hook, or other connecting mechanism. A hoist mechanism may be utilized to raise or lower the cradle in order to raise or lower the blowout preventer.

The cradle includes a frame which surrounds a circumference of the blowout preventer. The frame has a central opening for receipt of the blowout preventer. The diameter of the central opening is less than at least a portion of the blowout preventer.

The cradle includes a pivoting gate which closes the central opening in the frame. The gate is held in a closed position by pins. When one pin is removed, the gate may be pivoted to an open position. When the gate is in the open position, the cradle may be installed on or removed from the blowout preventer.

A plurality of adapters can be attached to the central opening of the frame to accommodate smaller diameter blowout preventers.

A plurality of brackets extend from the frame. Each bracket includes at least one opening therethrough to mate with an opening on the mounting frame. The brackets are capable of attachment to a storage, transport and lift skid assembly. Accordingly, when the cradle is attached to the assembly, movement of the assembly will move both the cradle and the blowout preventer.

A plurality of rollers are provided on an upper support surface of the frame. The rollers are partially recessed in the frame and extend slightly from the level of the upper support surface of the frame. Accordingly, the rollers will engage the blowout preventer.

In one embodiment, the rollers are arranged in pairs. Each of the rollers has a shaft which is arranged radially with respect to the position of the blowout preventer.

The blowout preventer may be manually rotated with respect to the cradle. In an alternate embodiment, at least one of the rollers or pair of rollers may be mechanically driven in order to drive the roller shaft so that the blowout preventer may be mechanically rotated.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
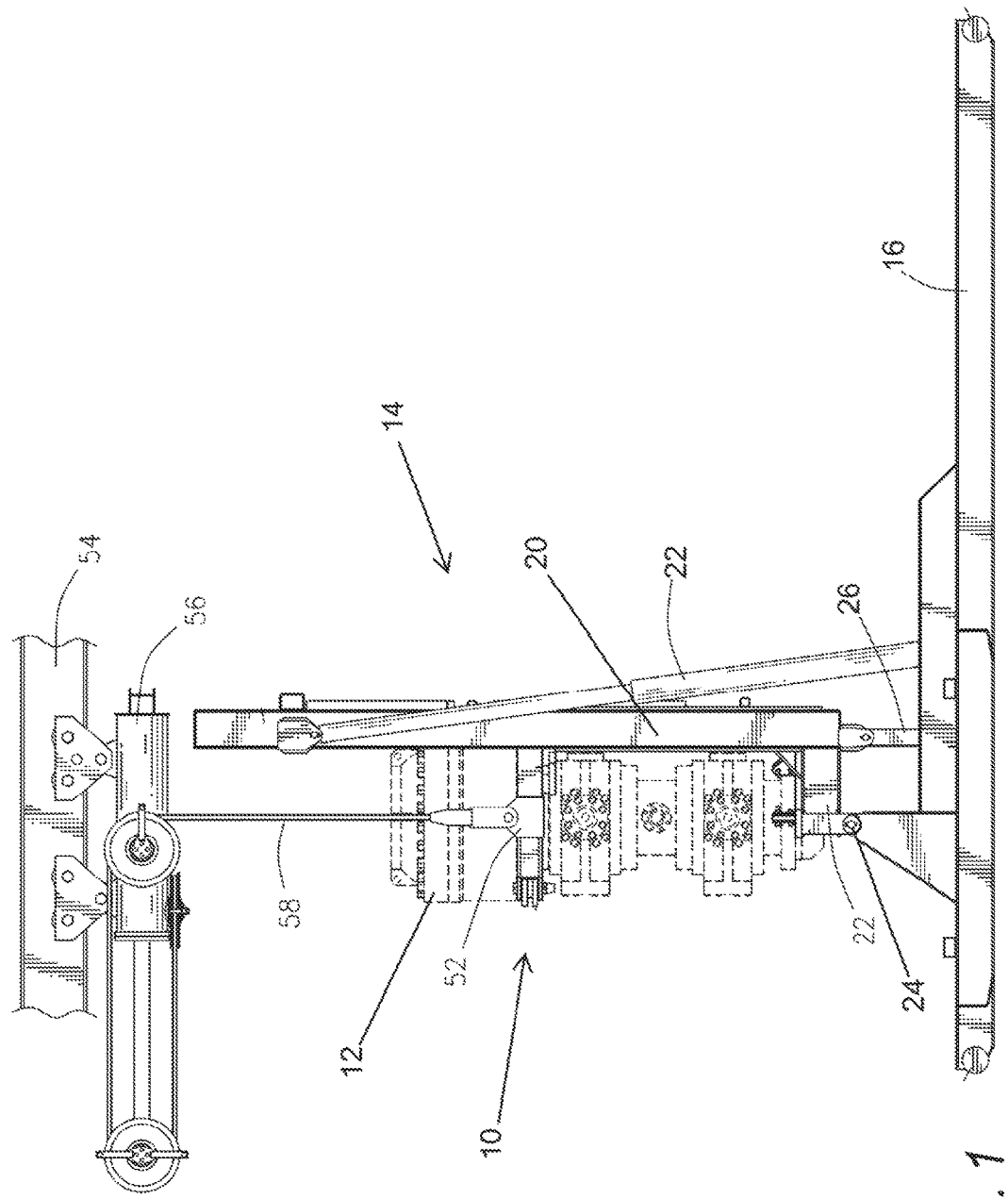
FIG. 1 illustrates a side view of a retention, transportation and positioning cradle installed around a blowout preventer and constructed in accordance with the present invention.

Referring to the drawings in detail, FIG. 1 illustrates a side view of a retention, transportation and positioning collar or cradle 10 installed around a blowout preventer 12 (shown in dashed lines). The blowout preventer 12 itself includes a series of valves, portions of which have outer cylindrical shapes. The blowout preventer may include a cylindrical flange and an enlarged cylindrical annular. The present invention will work with a variety of types and sizes of blowout preventers, although the blowout preventer 12 does not form a part of the present invention.

The blowout preventer 12 is ordinarily retained and transported in a horizontal storage and transport position which is perpendicular to the installation and removal position shown in FIG. 1.

The blowout preventer may be retained and transported on a storage, transport and lift skid assembly 14, such as shown in Applicant's application Ser. No. 14/718,284 (now U.S. Pat. No. 9,488,023) which is incorporated herein by reference. The assembly 14 includes a base frame 16 in the form of an elongated skid that may be receivable on a tractor trailer (not shown). Accordingly, the base frame 16 may be lifted or dragged on and off of the tractor trailer.

A mounting frame 20 receives the blowout preventer 12 thereon. The mounting frame 20 is movable and rotatable about a pivot pin or pins 24 between an installation and removal position substantially perpendicular to the base frame 16, as shown in FIG. 1, and a storage and transport position substantially parallel to the base frame 16. As will be described in detail herein, the blowout preventer 12 is connected to the mounting frame through the cradle 10 of the present invention.

The mounting frame 20 pivots or rotates with respect to the base frame 16. An actuator mechanism in the form of a cylinder or a pair of hydraulic cylinders 22, each including an extending and retracting ram, are pivotally connected to the mounting frame 20 and pivotally connected to the base frame 16.

As the rams of the hydraulic cylinders 22 extend, the mounting frame 20 is moved toward the vertical installation position. Conversely, as the rams of the cylinders retract, the mounting frame 20 is moved toward the horizontal storage and transportation position. It will be appreciated that pneumatic cylinders or another actuator mechanism may be employed within the spirit and scope of the invention.

Once the hydraulic cylinders 22 have moved the mounting frame 20 with the blowout preventer thereon to a vertical installation position, a pair of connecting links 26 pivotally connected to the skid 16 are rotated in position and then pinned to the base frame 16 in order to lock the mounting frame 20 into a vertical position.

It will be appreciated that various types of storage and transport assemblies may be used within the spirit and scope of the invention.

As seen in FIG. 1, the cradle 10 also includes a pair of opposed projecting ears 52 (one ear visible in FIG. 1). Each of the ears 52 includes an opening therethrough for connection to a shackle, hook or other connecting mechanism.

The blowout preventer 12 is shown in FIG. 1 in a vertical position adjacent a drilling or rig floor 54 (only a portion of which is shown). The drilling or rig floor 54 will be arranged over the well (not shown). A trolley 56 moves along the underside of the drilling or rig floor 54 on a trolley beam or beams. A pair of cables 58 (one visible in FIG. 1) extend from the trolley 56. A shackle with a pin, a hook, or other connecting mechanism at one end of the cables 58 will connect to an opening in each ear 52 of the cradle 10. A trolley hoist mechanism (not shown) may be utilized to raise and lower the cradle 10 in order to raise or lower the blowout preventer 12.

Figure 2:
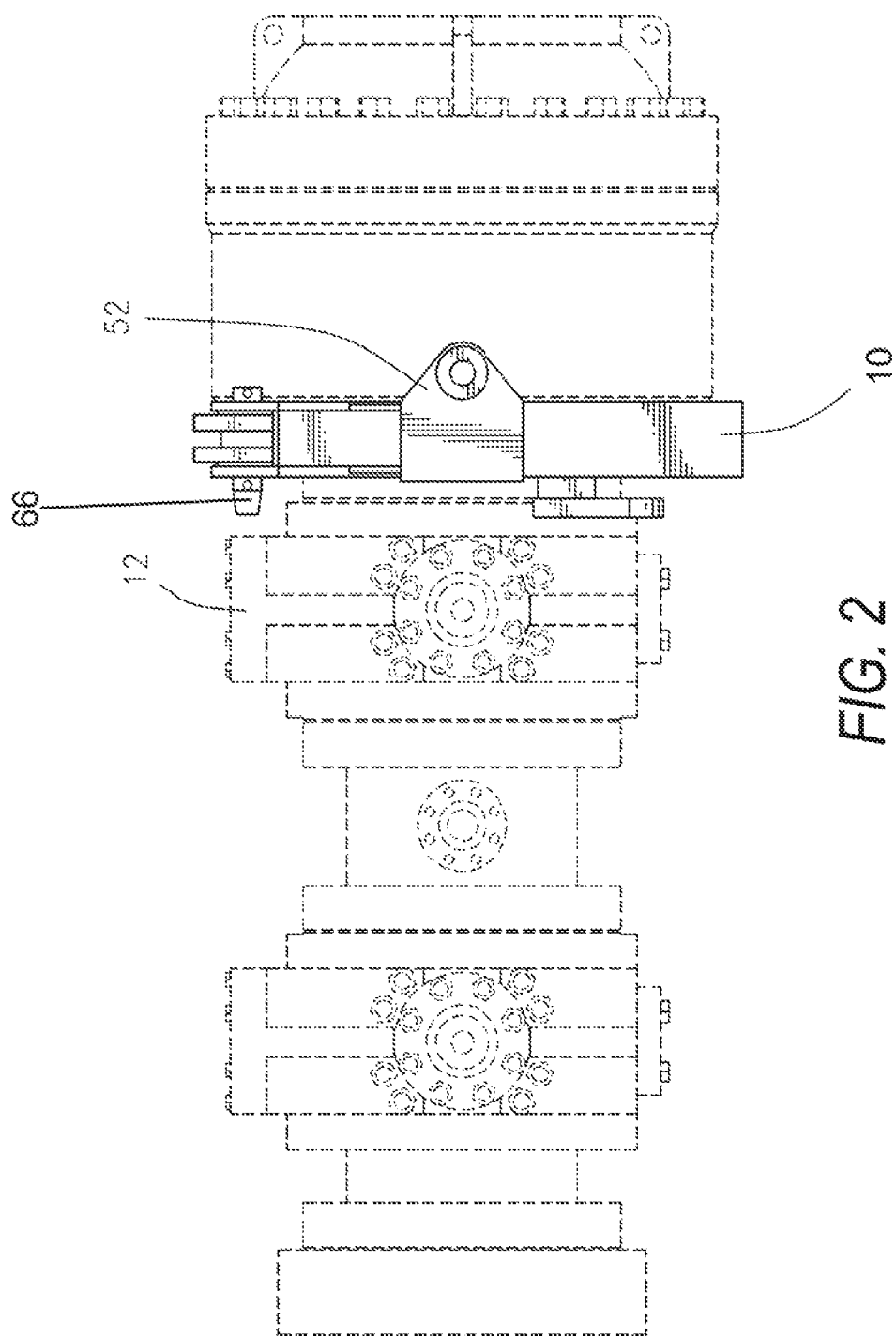
FIG. 2 illustrates the retention, transportation, and positioning cradle shown in FIG. 1 installed surrounding the blowout preventer.

FIG. 2 illustrates the cradle 10 installed surrounding the blowout preventer 12 (shown in dashed lines) apart from the storage, transport and lift skid assembly 14 and apart from the cables 58 and the trolley 56.

Figure 3:
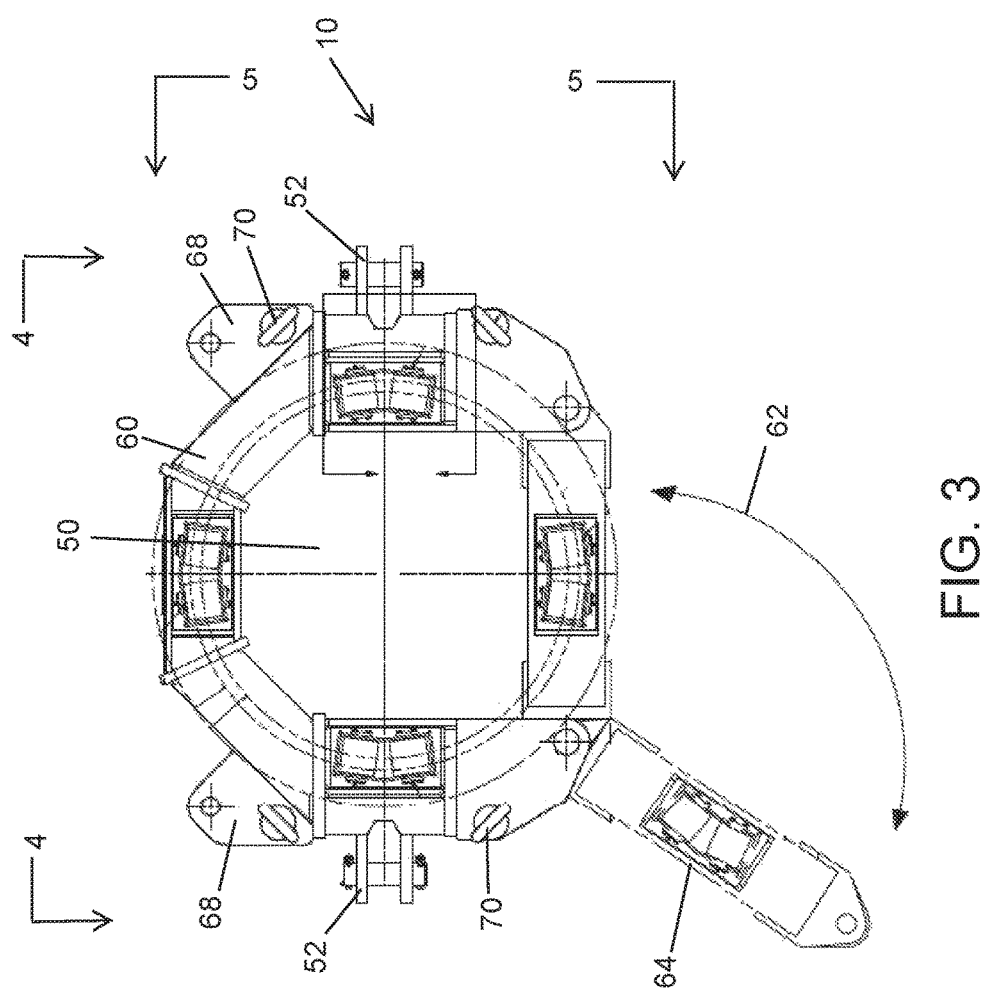
FIG. 3 illustrates a top view of the cradle shown in FIGS. 1 and 2 apart from the blowout preventer.
Figure 4:
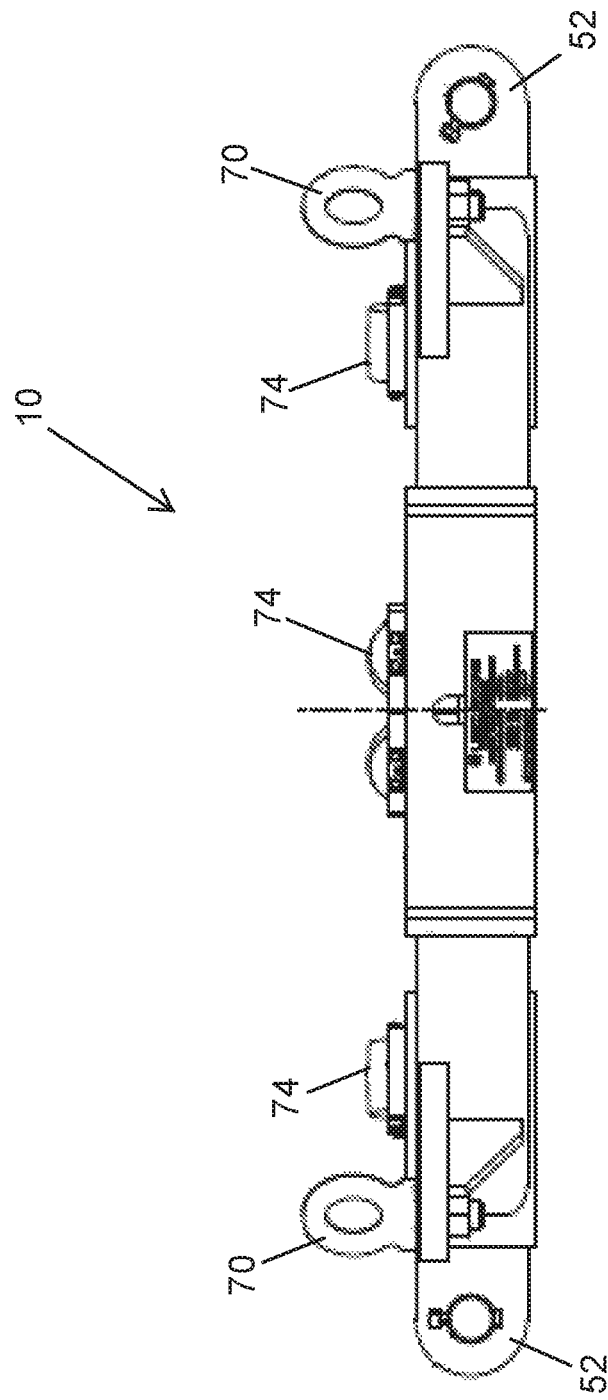
FIG. 4 illustrates a side view of the cradle shown in FIG. 3.

FIG. 3 illustrates a top view of the cradle 10 apart from the blowout preventer 12 and apart from the storage, transport and lift skid assembly 14 and FIG. 4 illustrates a side view taken along lines 4-4 of FIG. 3.

The cradle 10 includes a frame 60 which surrounds a circumference of the blowout preventer 12. In a preferred embodiment, the cradle 10 surrounds and encircles a cylindrical flange portion of the blowout preventer 12. The frame 60 has a central opening 50 for receipt of the blowout preventer 12. The central opening may be circular, hexagonal, octagonal, or take another shape. As best seen in FIGS. 2 and 3, the diameter of the central opening 50 is less than at least a portion of the diameter of the blowout preventer 12.

As seen in FIGS. 1 and 2, the enlarged diameter annular portion of the blowout preventer is above the cradle 10. The cradle 10 forms a shelf on which the blowout preventer 12 rests.

As seen in FIG. 3, the cradle 10 includes a pivoting gate 64 which closes the central opening 50 in the frame 60.

Figure 7:
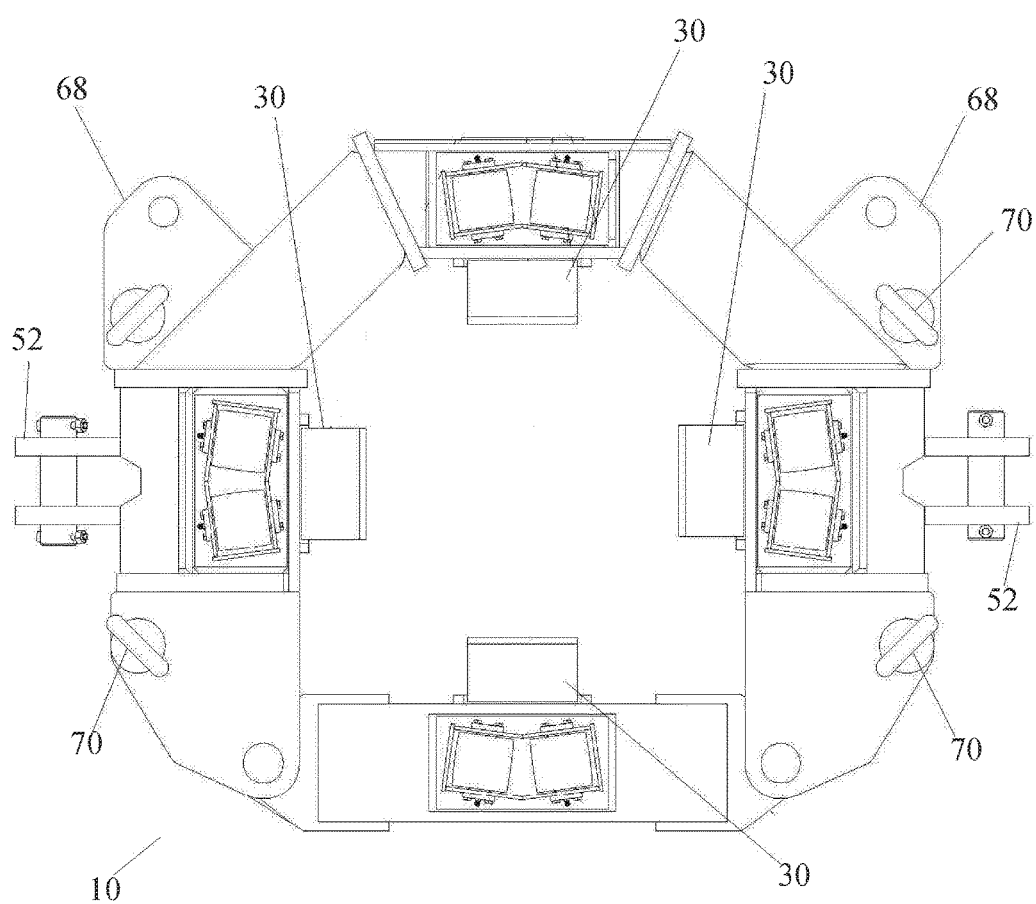
FIG. 7 is a top view of the cradle with a series of adapters to accommodate smaller diameter blow out preventers.

The gate 64 is held in a closed position by pins 66 (not visible in FIG. 3). When one pin 66 is removed, the gate 64 may be pivoted to an open position, as shown by arrow 62. As seen in FIG. 7, a set of variably sized insert adapters 30 can be affixed to the central opening 50 of the frame to produce a smaller central opening for retention of a smaller diameter blowout preventer (not shown).

Accordingly, the cradle 10 may be easily adapted to be used with a wide variety of blowout preventers.

When the gate 64 is in the open position, the cradle 10 may be installed on or removed from the blowout preventer 12. Once the gate 64 is closed and pinned, the blowout preventer is retained in the cradle so the blowout preventer is locked in the cradle 10.

Figure 5:
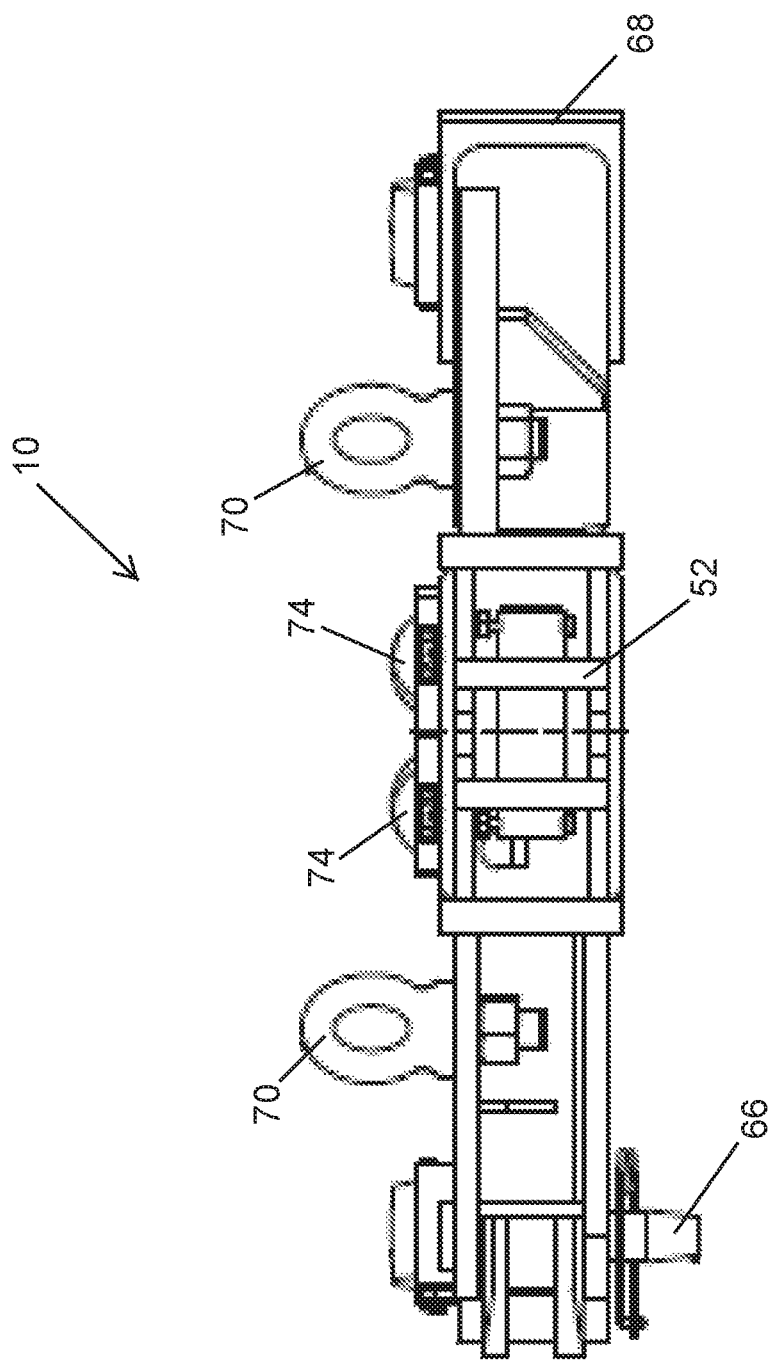
FIG. 5 illustrates an end view of the cradle shown in FIGS. 3 and 4.

FIG. 5 illustrates an end view of the cradle 10 taken along section line 5-5 of FIG. 3. The pins 66 holding the gate 64 in the closed position are visible.

With reference to FIG. 3 and continuing reference to FIG. 5, a plurality of brackets 68 extend from the frame 60. In the embodiment shown, each bracket 68 extends radially outward from the frame 60. Each bracket 68 includes at least one opening therethrough to mate with an opening on the mounting frame 20 of the assembly 14, as seen in FIG. 1.

The brackets 68 may thus be pinned to the mounting frame 20. Accordingly, the brackets 68 are capable of attachment to the storage, transport and lift skid assembly 14. Accordingly, when the cradle 10 is attached to the assembly 14, movement of the assembly 14 will move the cradle 10 and the blowout preventer.

In addition, a plurality of optional, secondary retention eyes 70 extend from the frame 20. A safety cable or cables (not shown) may be attached to the secondary retention eyes 70 to prevent unwanted movement of the blowout preventer 12.

Figure 6:
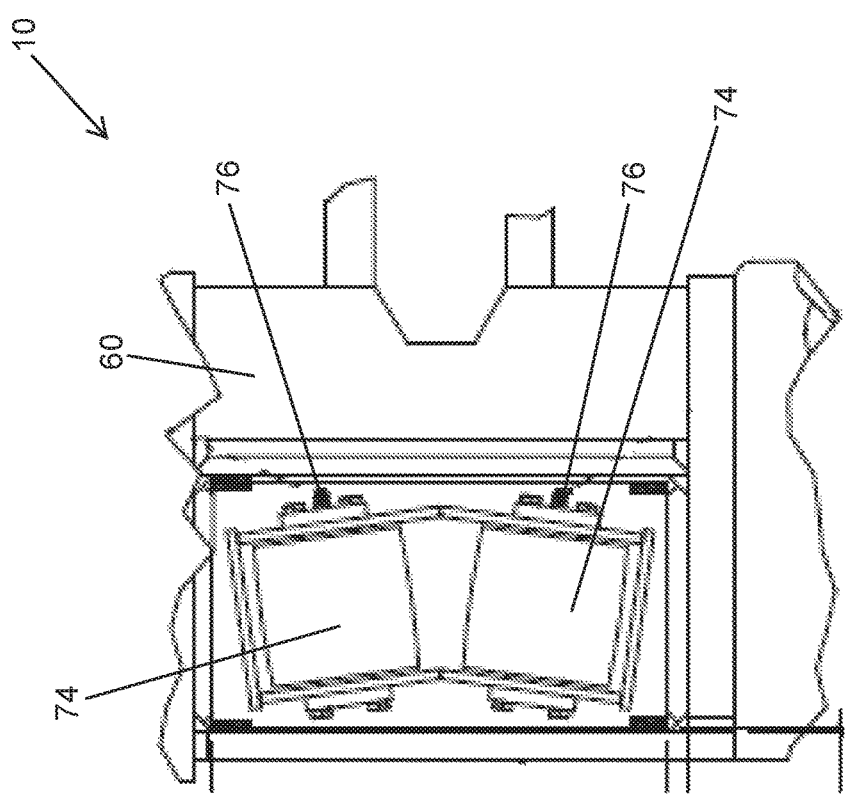
FIG. 6 is a partial view of the cradle taken along section line 6-6 of FIG. 3.

FIG. 6 is a partial view taken along section line 6-6 of FIG. 3. A plurality of rollers 74 are provided on an upper support surface of the frame 60. The rollers 74 are partially recessed in the frame and extend slightly from the level of the upper surface of the frame 60. In particular, the cradle 10 forms a shelf on which the annular of the blowout preventer 12 rests. Accordingly, the rollers 74 engage the blowout preventer 12 which rests thereon.

As seen in FIG. 3 and in the enlarged view seen in FIG. 6, the rollers 74 are arranged in pairs. Each of the rollers 74 has a shaft 76, which is arranged substantially radially with respect to the position of the blowout preventer. The rollers 74 themselves have an axis which is radial with respect to the blowout preventer 12. In the present embodiment, four pairs of rollers are employed, although three pairs of rollers or other configurations are possible.

When the frame 60 of the cradle is attached to the storage, transport and lift skid assembly 14, the blowout preventer 12 may be manually rotated with respect to the cradle 10. Additionally, when the frame 60 is suspended from the lift mechanism, the blowout preventer may be rotated with respect to the cradle.

Figure 8:
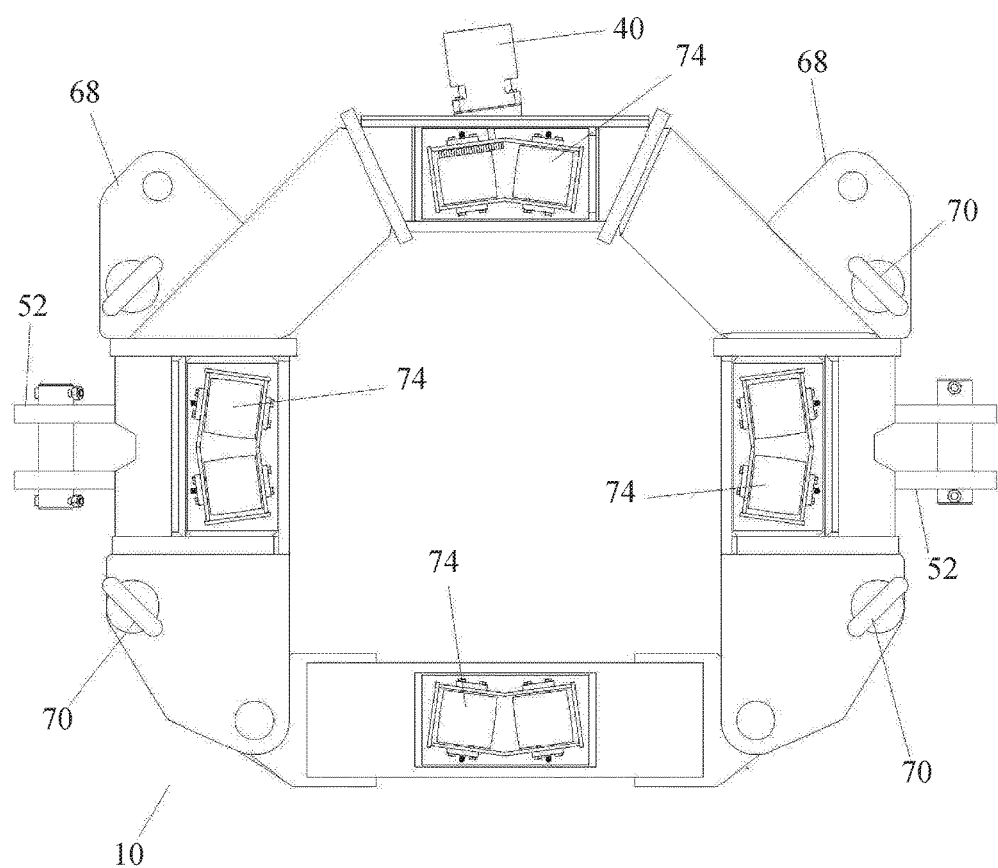
FIG. 8 is a top view of an alternate embodiment cradle with a hydraulic motor to rotate rollers.

In an alternate embodiment, as seen in FIG. 8, at least one of the rollers or pair of rollers 74 may be mechanically driven by a hydraulic motor with a gear in order to drive the roller shaft. Accordingly, the blowout preventer 12 may be rotated by the force of the rotating rollers.

Rotation of the blowout preventer will allow the blowout preventer 12 to be positioned when moving within the substructure of the rig. Additionally, rotation of the blowout preventer 12 allows the blowout preventer to be aligned with the wellhead and bolts on the wellhead (not shown) or passing through openings in the wellhead.

Whereas, the invention has been described in relation to the drawings attached hereto, it should be understood that other and further modifications, apart from those shown or suggested herein, may be made within the scope of this invention.

What is claimed is:

1. A retention, transportation and positioning cradle for a blowout preventer, which cradle comprises:

a frame surrounding a circumference of said blowout preventer, said frame having an opening for receipt or removal of a blowout preventer;
 a pivoting gate movable between an open position and a closed position and enclosing said opening on said frame when in said closed position;
 a plurality of rollers on an upper support surface of said frame to engage said blowout preventer, said plurality of rollers configured to permit rotation of the blowout preventer with respect to the cradle; and
 a lift connector mechanism on said frame to connect to a lift mechanism.

2. The retention, transportation and positioning cradle for a blowout preventer as set forth in claim 1 wherein each of said plurality of rollers has a shaft having an axis arranged radially with respect to said blowout preventer.

3. The retention, transportation and positioning cradle for a blowout preventer as set forth in claim 1 wherein each of said plurality of rollers are partially recessed in the frame and extend slightly from said upper support surface of said frame.

4. The retention, transportation and positioning cradle for a blowout preventer as set forth in claim 1 wherein said lift connector mechanism includes a pair of opposed projecting ears and wherein said lift mechanism includes cables attached to said ears.

5. The retention, transportation and positioning cradle for a blowout preventer as set forth in claim 1 including a plurality of adjustable brackets extending from said frame.

6. The retention, transportation and positioning cradle for a blowout preventer as set forth in claim 1 wherein said brackets extend radially outward from said frame.

7. The retention, transportation and positioning cradle for a blowout preventer as set forth in claim 5 wherein said plurality of adjustable brackets extending from said frame are capable of attachment to a storage, transport and lift skid assembly.

8. The retention, transportation and positioning cradle for a blowout preventer as set forth in claim 1 including a plurality of secondary retention eyes extending from said frame.

9. The retention, transportation and positioning cradle for a blowout preventer as set forth in claim 1 wherein said pivoting gate is pinned to said frame.

10. The retention, transportation and positioning cradle for a blowout preventer as set forth in claim 1 wherein insert adapters are affixed to the frame to accommodate various size blowout preventers, said insert adapters configured to engage said blowout preventer.

11. The retention, transportation and positioning cradle for a blowout preventer as set forth in claim 1 wherein at least one of said plurality of rollers is driven by a hydraulic motor.

* * * * *